United States Patent
Atkins et al.

(10) Patent No.: US 7,827,240 B1
(45) Date of Patent: Nov. 2, 2010

(54) CALENDAR ITEM HIERARCHY FOR AUTOMATIC SPECIALIZATION

(75) Inventors: Richard J. Atkins, Chatswood (AU); Sunny Singh Kalsi, Macquarie Fields (AU); Rohan Lenard, Birchgrove (AU); David Thambiratnam, Ashfield (AU)

(73) Assignee: Avaya Inc., Basking Ridge, NJ (US)

( * ) Notice: Subject to any disclaimer, the term of this patent is extended or adjusted under 35 U.S.C. 154(b) by 611 days.

(21) Appl. No.: 11/619,145

(22) Filed: Jan. 2, 2007

(51) Int. Cl.
*G06F 15/16* (2006.01)
*G06F 9/46* (2006.01)

(52) U.S. Cl. .......................... 709/204; 709/200; 705/9

(58) Field of Classification Search ............... 709/200, 709/203–204, 206; 705/9
See application file for complete search history.

(56) References Cited

U.S. PATENT DOCUMENTS

| | | | |
|---|---|---|---|
| 4,819,191 A | 4/1989 | Scully et al. | |
| 4,831,552 A | 5/1989 | Scully et al. | |
| 5,050,077 A | 9/1991 | Vincent | |
| 5,124,912 A | 6/1992 | Hotaling et al. | |
| 5,197,000 A | 3/1993 | Vincent | |
| 5,206,903 A | 4/1993 | Kohler et al. | |
| 5,216,603 A | 6/1993 | Flores et al. | |
| 5,323,314 A | 6/1994 | Baber et al. | |
| 5,428,784 A | 6/1995 | Cahill, Jr. | |
| 5,555,346 A | 9/1996 | Gross et al. | |
| 5,619,555 A | 4/1997 | Fenton et al. | |
| 5,627,978 A | 5/1997 | Altom et al. | |
| 5,774,867 A | 6/1998 | Fitzpatrick et al. | |
| 5,793,365 A | 8/1998 | Tang et al. | |
| 5,813,013 A | 9/1998 | Shakib et al. | |
| 5,828,747 A | 10/1998 | Fisher et al. | |
| 5,889,945 A | 3/1999 | Porter et al. | |
| 5,893,073 A | 4/1999 | Kasso et al. | |
| 5,905,793 A | 5/1999 | Flockhart et al. | |
| 5,920,701 A | 7/1999 | Miller et al. | |
| 5,960,406 A | 9/1999 | Rasansky et al. | |
| 5,982,873 A | 11/1999 | Flockhart et al. | |
| 6,064,976 A | 5/2000 | Tolopka | |

(Continued)

FOREIGN PATENT DOCUMENTS

EP        1014286        6/2000

(Continued)

OTHER PUBLICATIONS

Online Training Solutions, Inc., "Step by Step," Microsoft Outlook 2003, pp. 120-225, USA.

(Continued)

*Primary Examiner*—Nathan Flynn
*Assistant Examiner*—Joshua Joo
(74) *Attorney, Agent, or Firm*—Sheridan Ross P.C.

(57) ABSTRACT

The present invention provides methods and systems for specializing calendar items. More specifically, a user or number of users may receive a calendar item having certain original parameters. The receiving user may wish to adjust those parameters for a subset of users that may or may not include the calendar item originator. The receiving user can then specialize certain parameters of the calendar item and transmit them to the determined subset of users without sending the same specialized calendar item to users outside of the subset that received the original calendar item.

20 Claims, 7 Drawing Sheets

U.S. PATENT DOCUMENTS

| | | | |
|---|---|---|---|
| 6,085,166 | A | 7/2000 | Beckhardt et al. |
| 6,101,480 | A | 8/2000 | Conmy et al. |
| 6,147,685 | A | 11/2000 | Bliss et al. |
| 6,163,607 | A | 12/2000 | Bogart et al. |
| 6,173,053 | B1 | 1/2001 | Bogart et al. |
| 6,192,111 | B1 | 2/2001 | Wu |
| 6,192,122 | B1 | 2/2001 | Flockhart et al. |
| 6,272,074 | B1 | 8/2001 | Winner |
| 6,360,217 | B1 | 3/2002 | Gopal et al. |
| 6,363,352 | B1 | 3/2002 | Dailey et al. |
| 6,377,965 | B1 | 4/2002 | Hachamovitch et al. |
| 6,434,571 | B1 | 8/2002 | Nolte |
| 6,570,555 | B1 | 5/2003 | Prevost et al. |
| 6,594,637 | B1 | 7/2003 | Furukawa et al. |
| 6,640,230 | B1 | 10/2003 | Alexander et al. |
| 6,662,309 | B2 | 12/2003 | Ando et al. |
| 6,675,356 | B1 | 1/2004 | Adler et al. |
| 6,694,335 | B1 * | 2/2004 | Hopmann et al. ............ 707/201 |
| 6,731,323 | B2 | 5/2004 | Doss et al. |
| 6,988,128 | B1 | 1/2006 | Alexander et al. |
| 7,007,235 | B1 | 2/2006 | Hussein et al. |
| 7,016,909 | B2 | 3/2006 | Chan et al. |
| 7,035,865 | B2 | 4/2006 | Doss et al. |
| 7,082,402 | B2 | 7/2006 | Conmy et al. |
| 7,113,797 | B2 | 9/2006 | Kelley et al. |
| 7,130,885 | B2 | 10/2006 | Chandra et al. |
| 7,149,810 | B1 * | 12/2006 | Miller et al. ................. 709/246 |
| 7,155,435 | B1 * | 12/2006 | Day et al. ..................... 707/10 |
| 7,187,384 | B2 | 3/2007 | Noyle |
| 7,188,073 | B1 | 3/2007 | Tam et al. |
| 7,254,569 | B2 | 8/2007 | Goodman et al. |
| 7,343,312 | B2 | 3/2008 | Capek et al. |
| 7,343,313 | B2 | 3/2008 | Dorenbosch et al. |
| 7,353,466 | B2 | 4/2008 | Crane et al. |
| 7,363,590 | B2 | 4/2008 | Kerr et al. |
| 7,383,291 | B2 * | 6/2008 | Guiheneuf et al. .......... 707/203 |
| 7,383,303 | B1 | 6/2008 | Bort |
| 7,395,221 | B2 | 7/2008 | Doss et al. |
| 7,436,654 | B2 | 10/2008 | Cho |
| 7,440,961 | B1 | 10/2008 | Matousek |
| 7,519,672 | B2 | 4/2009 | Boss et al. |
| 7,595,717 | B2 | 9/2009 | Boss et al. |
| 2001/0054072 | A1 | 12/2001 | Discolo et al. |
| 2002/0085701 | A1 | 7/2002 | Parsons et al. |
| 2002/0117847 | A1 | 8/2002 | Ede et al. |
| 2002/0120600 | A1 | 8/2002 | Schiavone et al. |
| 2002/0144136 | A1 | 10/2002 | Stornetta et al. |
| 2003/0069880 | A1 | 4/2003 | Harrison et al. |
| 2003/0149606 | A1 | 8/2003 | Cragun et al. |
| 2003/0154293 | A1 | 8/2003 | Zmolek |
| 2003/0163537 | A1 | 8/2003 | Rohall et al. |
| 2004/0054726 | A1 | 3/2004 | Doss et al. |
| 2004/0128181 | A1 | 7/2004 | Zurko et al. |
| 2004/0192857 | A1 | 9/2004 | Borer et al. |
| 2004/0199663 | A1 | 10/2004 | Horvitz et al. |
| 2004/0254998 | A1 | 12/2004 | Horvitz |
| 2005/0069099 | A1 | 3/2005 | Kozdon et al. |
| 2005/0125246 | A1 | 6/2005 | Muller et al. |
| 2005/0125248 | A1 | 6/2005 | Butterworth et al. |
| 2005/0165631 | A1 | 7/2005 | Horvitz |
| 2005/0192857 | A1 | 9/2005 | Levine |
| 2005/0198144 | A1 | 9/2005 | Kraenzel et al. |
| 2006/0004843 | A1 | 1/2006 | Tafoya et al. |
| 2006/0020889 | A1 | 1/2006 | Coppinger et al. |
| 2006/0031326 | A1 | 2/2006 | Ovenden |
| 2006/0031470 | A1 | 2/2006 | Chen et al. |
| 2006/0047557 | A1 | 3/2006 | Bieselin et al. |
| 2006/0069686 | A1 | 3/2006 | Beyda et al. |
| 2006/0184584 | A1 | 8/2006 | Dunn et al. |
| 2006/0190485 | A1 * | 8/2006 | Adams et al. ............ 707/104.1 |
| 2006/0242109 | A1 | 10/2006 | Pereira et al. |
| 2007/0016878 | A1 | 1/2007 | Forlenza et al. |
| 2007/0118415 | A1 | 5/2007 | Chen et al. |
| 2007/0174104 | A1 * | 7/2007 | O'Sullivan et al. ............. 705/9 |
| 2007/0265903 | A1 | 11/2007 | Blair et al. |
| 2008/0005685 | A1 | 1/2008 | Drews et al. |
| 2008/0034425 | A1 | 2/2008 | Overcash et al. |
| 2008/0037733 | A1 | 2/2008 | Chen et al. |

FOREIGN PATENT DOCUMENTS

| | | |
|---|---|---|
| EP | 1560138 | 8/2005 |
| WO | WO 2005/010715 | 2/2005 |

OTHER PUBLICATIONS

U.S. Appl. No. 10/770,640, filed Feb. 2, 2004, Mohler.
U.S. Appl. No. 11/350,050, filed Feb. 7, 2006, Atkins et al.
U.S. Appl. No. 11/488,487, filed Jul. 17, 2006, Daily et al.
U.S. Appl. No. 11/554,442, filed Oct. 30, 2006, Atkins et al.
U.S. Appl. No. 11/554,478, filed Oct. 30, 2006, Atkins et al.
U.S. Appl. No. 11/554,497, filed Oct. 30, 2006, Chu et al.
U.S. Appl. No. 11/669,707, filed Jan. 31, 2007, Blair et al.
"Avaya™ Unified Communication Center (UCC) Speech Access Solution", Avaya, Inc. (2002), 4 pages.
"How to Use a TTY", NETAC Teacher Tipsheet, htt://72.14.203.104/search?q=cache:JdktLkxPgMUJ:www.netac.rit.edu/downloads/TPSHT_TTY.pdf+%22teletypewriter%22+... (1999) 4 pages.
"Meetings in America", MCI Conferencing, available at http://e-meetings.mci.com/meetingsinamerica/uswhitepaper.php3, website updated Aug. 19, 2003, pp. 1-12.
"TTY Brochure Feb. 2006", http://72.14.203.104/search?q=cache:O3tW0eQtbTEF:ods.utk.edu/brochures/TTYBrochureFebruary2006.pdf+%22teletypewrite... (Feb. 2006) 3 page.
"WebAccess Client User Guide" Novell GroupWise 6.5, Oct. 31, 2005, 68 pages.
AIM Acronym Dictionary, http://www.aim.com/acronyms.adp (Jan. 16, 2007) 7 pages.
AIM Bots, http://developer.aim.com/botMain.jsp (2006) 2 pages.
AIM Buddy Info, http://buddyinfo.aim.com/ (2006) 2 pages.
AIM Presence Services, http://developer.aim.com/presenceMain.jsp (2006) 2 pages.
Arthur M. Rosenberg and David A. Zimmer, "Beyond VoIP: Enterprise Perspectives On Migrating To Multi-Modal Communications And Wireless Mobility", (Oct. 2004) 38 pages.
Arthur M. Rosenberg and David A. Zimmer, "Migrating To Enterprise-Wide Communications: The Branch Office Dilemma", May 2003, 14 pages.
Avaya By Example; Three-Week Wonder: Avaya Unified Communication Center Speech Access Gives Road Warriors 15 Additional Days Each Year, Avaya, Inc. (2005) 3 page.
Boyce, "Microsoft Office Outlook 2003 Inside Out," Nov. 5, 2003, Microsoft Press, Chapters 1, 19, 20.
Chapters 4, 5 and 7 from Microsoft® Office Outlook® 2003; "Step by Step"; Online Training Solutions, Inc.
Dave Anderson and George McNeill, "Artificial Neural Networks Technology", http://www.dacs.dtic.mil/techs/dacs_reports/text/neural_nets.txt (Aug. 20, 1992) 145 pages.
Dey et al., CybreMinder: A Context-Aware System for Supporting Reminders, Handheld and Ubiquitous Computing: Second International Symposium, HUC 2000, Bristol, UK, Sep. 2000. Proceedings, Jul. 31, 2003, 15 pages, vol. 1927/2000, Springer Berlin/Heidelberg.
"Microsoft Outlook" http://en.wikipedia.org/wiki/Microsoft_Outlook; printed Mar. 14, 2006; 4 pages.
"FreeBusy—Microsoft Outlook email autoresponder" http://freebusy.4team.biz/; printed May 24, 2006; 4 pages.
"Microsoft Outlook in Your Small Business" http://www.bcentral.co.uk/products/microsoft-outlook.mspx; printed Mar. 14, 2006; 2 pages.
http://www.effectivemeetings.com (Smart Technologies, Inc., May 2003).
Ivtta Turin 98, "The Linguistic Components Of The Reward Dialogue Creation Environment And Run Time System", http://cpk.auc.dk/~tb/articles/ivtta98.htm (Sep. 1998) 13 pages.

Rob Kassel, "How Speech Recognition Works", http://www.microsoft.com/speech/docs/How_Speech_Works_Article.htm (Nov. 30, 2004) 4 pages.

Tony Vitale, "Hardware And Software Aspects Of A Speech Synthesizer Developed For Persons With Disabilities", http://codi.buffalo.edu/archives/computing/dec.speech (1993).

Yin "[Design] linking and grouping items", available at http://lists.osafoundation.org/pipermail/design/2005-August/003159.html Aug. 1, 2005, pp. 1-2.

Background for the above-captioned application (previously provided).

Avaya Case Study (Advertising Agency Uses Avaya Unified Messenger to Streamline Communications, 2003 Avaya Inc.), 2 pages.

U.S. Appl. No. 12/570,933, filed Sep. 30, 2009, Mohler.

Avaya Press Release (Avaya Introduces IBM Lotus Domino Version of Its Market-Leading Unified Messaging Software, http://www.avaya.com/usa/Error404.aspx?currentpath=master-usa/en-us/corporate/pressroom/pressreleases/2003/pr-03, Jan. 27, 2003), 4 pages.

Avaya Unified Messenger Client User Guide (2002 Avaya Inc.) Avaya Web Pages (Retrieved Archive.org from Jun. 13, 2004), 167 pages.

Avaya Unified Messenger Solution—Microsoft Exange 2000 version Installation Guide (2002 Avaya Inc.) 164 pages.

Avaya Unified Messenger Solution—Microsoft Exange Version, 2000 version (2002 Avaya Inc), 8 pages.

Clayton, Brad "Microsoft Outlook 2003 Enhancements", modified Apr. 19, 2004, Purdue University, 4 pages.

AvantGo: AvantGo launches new release of Pylon products; AvantGo Pylon 5.1 offers new support for Domino 6, Palm OS 5 and custom repeating meetings M2 Presswire. Coventry: Jan. 24, 2003. p. 1-4.

"Special Edition Using Lotus Notes and Domino 5" (Published by Que, Aug. 23, 1999, ISBN 0-7897-1814-6.

"Windows Client User Guide" (Novell Groupwise 7.0, Mar. 14, 2008, copyright 2005-2008) discloses Groupwise 7.0 (released Aug. 15, 2005), 389 pages.

Boyce, "Microsoft Office Outlook 2003 Inside Out," Nov. 5, 2003, Microsoft Press, Chapter 2.

Online Training Solutions, Inc., "Step by Step," Microsoft Outlook 2003, pp. 226-334, USA.

RAIDER, "Make Address Book Smart Groups auto-complete in mail," MacOsHints.com, contributed Jun. 29, 2005, pp. 1-4.

\* cited by examiner

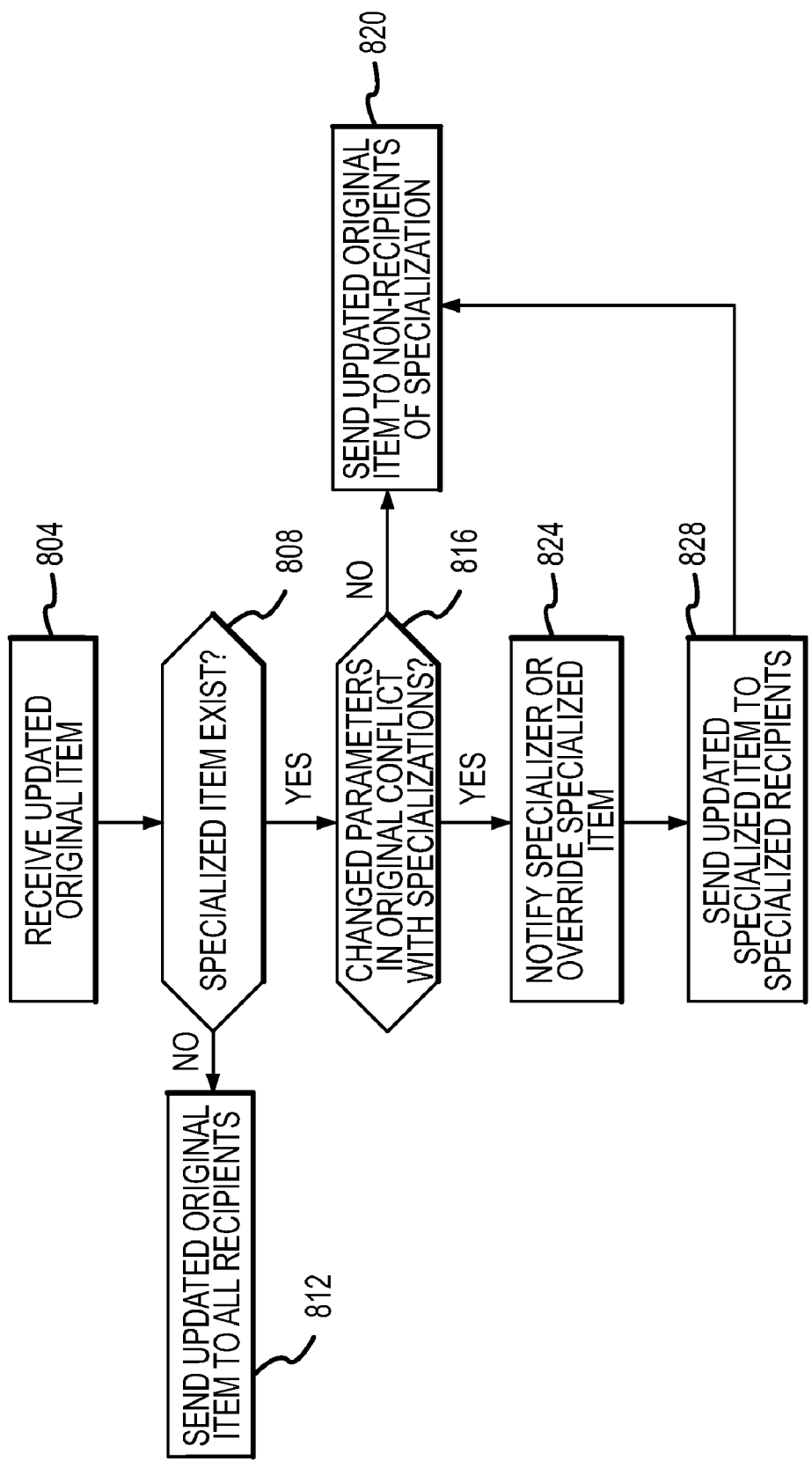

CALENDAR ITEM HIERARCHY FOR AUTOMATIC SPECIALIZATION

FIELD OF THE INVENTION

The invention relates generally to meeting and resource management. More particularly, the invention relates to a hierarchical structure for managing meetings and other shared resources.

BACKGROUND

Electronic mail has become a widely used business communication and organization application. The use of email has proliferated well beyond the simple act of sending and receiving messages. Email is currently used as a platform for meeting coordination and resource sharing. Additionally, applications like electronic calendars and planners are widely used with email. There are a number and variety of interactive electronic calendaring systems and methods currently available to email users. The objective of all of these systems is primarily to assist the person who, for a number of different reasons, maintains a calendar of future events containing various information about the events at entry points on the calendar, which relate to the time of the event. The events have a number of different parameters (e.g., location, time, resources, attendees, invitees, etc.) that help define the event.

The increased availability and usefulness of personal computers and intelligent workstations in recent years has made it possible for calendar owners to establish and maintain these calendars on these interactive type data processing systems. Hence, the term "electronic calendaring systems."

Calendar owners are able to share their events or calendar items with other users if they wish to either invite them to the calendar item or at least make them aware the calendar item exists. The recipients of the calendar item are allowed to agree to and accept the terms (i.e., parameters) of the calendar item or decline the calendar item. In the past, if the recipient did not agree to one or more of the parameters of the original calendar item, he/she could create a new calendar item that has the changed parameter and then send the new calendar item to all recipients in an attempt to amend the original parameters of the calendar item. A problem with this particular solution is that if multiple recipients want to change parameters of the calendar item, then multiple calendar items will exist for the same event among the set of original recipients. This may lead to confusion between potential participants as to which calendar item dictates the actual event.

Essentially, any calendar item shared among a population (e.g., an entire company) has a certain set of parameters. If some property needs to be different for a subset of that population (e.g., a particular department, section of that department, subsections, etc.) receiving the original calendar item, there is no efficient way of dealing with the calendar item. For example, if a meeting is requested for an entire company, and a particular department needs to meet in a different room, then there is no easy way to send a different meeting request to that department without creating confusion about the actual location of the meeting.

There have been some attempts to solve this problem. In particular, some solutions involve the duplication of calendar items. Referring to the example above, User B may send a meeting request to the particular department, with details that add or change the details of an original meeting sent by User A. A problem is that any time the details of the original meeting changes, User B must also issue the same change to his/her meeting.

There are a number of other complicating situations that may arise when one user wishes to change certain aspects of an original calendar item. The complicating situations may lead to confusion regarding the calendar item and a waste of time in resolving such confusion.

SUMMARY

These and other needs are addressed by various embodiments and configurations of the present invention. The present invention is directed generally to a hierarchical organization of calendar items and their associated parameters. More specifically, an original calendar item with a first set of parameters can be specialized by a party other than the originator without effecting a change to how the originator views the calendar item.

In accordance with one embodiment of the present invention, a method is provided. The method comprises the steps of:

(a) receiving a first calendar item having at least one parameter from an originator;

(b) adjusting the at least one parameter to create a second calendar item having adjusted at least one parameter;

(c) determining at least one recipient for the second calendar item, wherein the at least one recipient excludes the originator; and (d) sending the second calendar item to the at least one recipient.

As used herein a "calendar item" is understood to include a temporally scheduled calendar item including without limitation schedules, meetings, or requests thereof and tasks. A calendar item is essentially used as a coordination of activities between two or more individuals.

Often a recipient of a calendar item may not agree to all of the parameters set by the originator. Moreover, the parameters may not even apply to all recipients of the calendar item. In a global economy with events being coordinated across time zones, many recipients will likely want to change some aspects of an original calendar item. To accomplish this, in one embodiment, parameters of the original calendar item can be specialized and transmitted to other recipients to notify them of a relevant change. However, the originator may not want to be bothered with such a change, nor do the recipients of the original calendar item want to receive a second disparate calendar item related to the same event. Rather, in accordance with at least one embodiment, by specializing an original calendar item, a user can notify recipients of parameter changes to the original calendar item without confusing them with a second calendar item or bothering the originator.

In accordance with one embodiment of the present invention, a recipient specializes one or more parameters of a received calendar item. In the event that such a specialization would result in a conflict, the recipient is asked to resolve the conflict. Moreover, if at some point the originator of the first calendar item desires to update the original calendar item, the updated parameters are compared to the specialized parameters to determine if any conflicts exit. If no conflicts exist, then the group that has received the specialized calendar item does not need to be notified of the updates, whereas the non-specialized group does need to receive updates. By separating a population of calendar item participants into specialized and non-specialized groupings of participants, each group can be treated differently based on their locations, work schedules, needs, etc and changes to one group of the participants do not have to bother or confuse any other participants.

In accordance with one embodiment, a hierarchical system is created to govern how specializations should be handled and also how potential conflicts should be resolved. If conflicts are detected then parameters that have been defined higher on the hierarchical structure may supersede parameter changes that have been made at a lower level of the hierarchical structure. A hierarchical approach to calendar item management affords for ease of conflict resolution and a unified approach to calendar item parameter administration.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIG. 8 is a flow chart depicting a method of updating an original calendar item in accordance with embodiments of the present invention.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to manage meetings or other shared resources.

Figure 1:
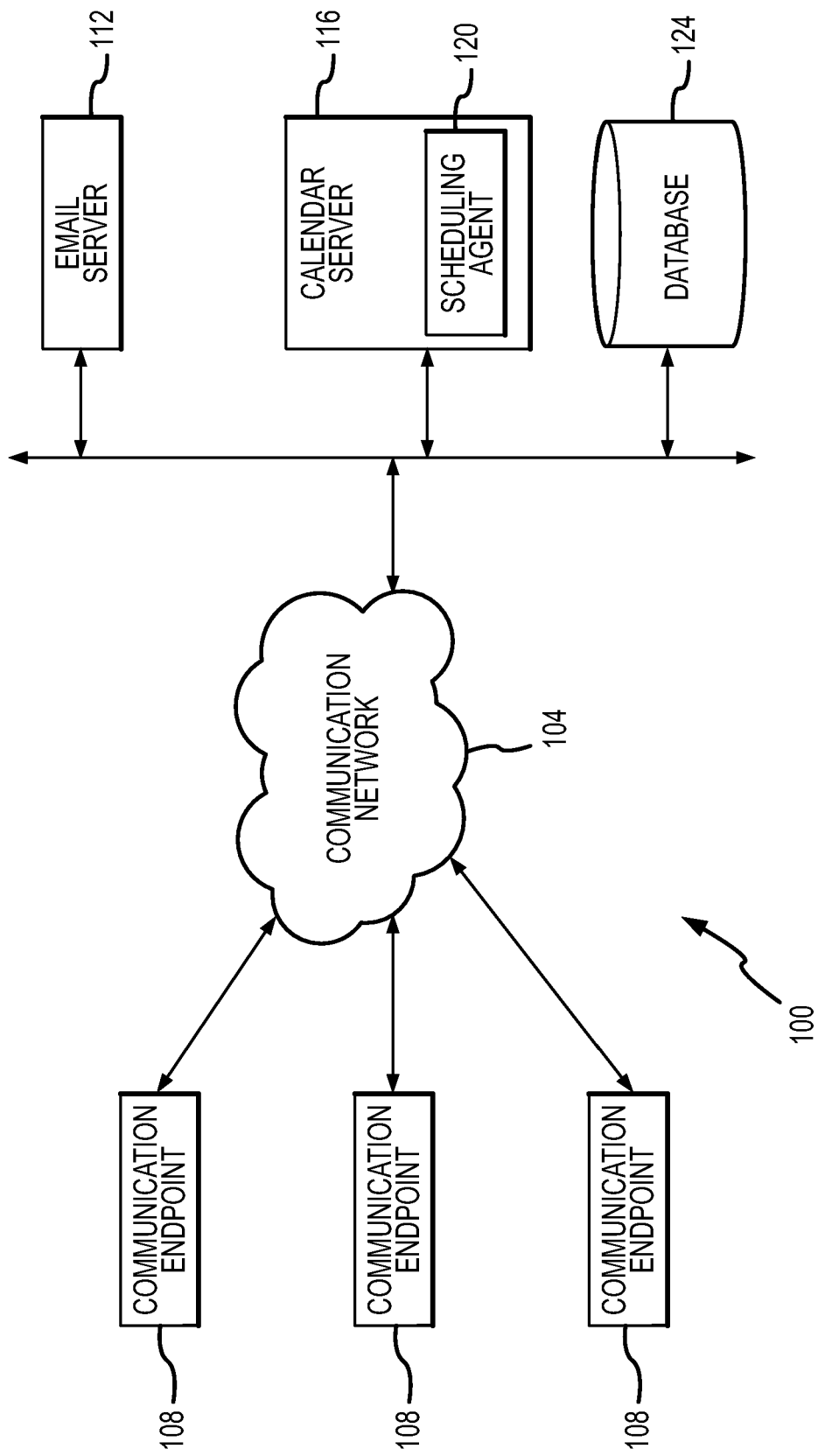
FIG. 1 is a block diagram depicting a communication system in accordance with embodiments of the present invention.

Referring initially to FIG. 1, a communication system 100 will be described in accordance with at least some embodiments of the present invention. The communication system 100 generally comprises a communication network 104, one or more communication endpoints 108, an email server 112, a calendar server 116 having a scheduling agent 120, and a database 124.

The communication endpoints 108 can be any of a number of packet-switched or circuit-switched devices including, without limitation, analog phone, digital phone, Personal Computer (PC), laptop, Personal Digital Assistant (PDA), IP hardphone, IP softphone, wireless phone, cellular phone, and networking equipment.

As examples, a communication endpoint 108 may comprise a conventional wireline or wireless telephone, an Internet protocol (IP) telephone, a networked computer, a personal digital assistant (PDA), a television, radio or any other device capable of transmitting or receiving speech and/or data.

A server 112, 116, in accordance with embodiments of the present invention, may comprise a communication server or other computer that functions to provide services to client devices. The email server 112 provides email capabilities to users of the communication endpoints 108. By accessing the email server 112, the communication endpoint 108 can view email that has been sent to a particular user associated with the communication endpoint 108.

The calendar server 116 may work in conjunction with the email server 112 to provide scheduling and resource management capabilities to the communication devices 108. The email server 112 may access applications on the calendar server, like the scheduling agent 120, to perform scheduling functions via email. For example, a calendar service may be provided via an email application stored on the email server 112. Information related to the calendar service may be retrieved from the calendar server 116 and presented to the user through an email application. In one embodiment, calendar items may be generated and transmitted to various users of the communication endpoints 108 via email, where a calendar item may relate to a task, meeting, and/or request for a shared resource. In one embodiment, the scheduling agent 120 is operable to determine if there are any conflicts between scheduled calendar items. More specifically, the scheduling agent 120 may be capable of identifying conflicting original and specialized parameters of a single calendar item or between a number of calendar items. As can be appreciated by one of skill in the art, the functionality of the email server 112 and calendar server 116 may be combined into a single server or processor capable of providing email and scheduling services to the communication endpoints 108.

The communication network 104 may comprise a converged network for transmitting voice and data between associated devices 108 and/or servers 112, 116. Furthermore, it should be appreciated that the communication network 104 need not be limited to any particular type of network. Accordingly, the communication network 104 may comprise a wireline or wireless Ethernet network, the Internet, a private intranet, a private branch exchange (PBX), the public switched telephony network (PSTN), a cellular or other wireless telephony network, or any other network capable of transmitting data, including voice data. In addition, it can be appreciated that the communication network 104 need not be limited to any one network type, and instead may be comprised of a number of different networks and/or network types.

The database 124 may include any data storage medium capable of maintaining data related to users of the communication endpoints 108, the communication endpoints 108, calendar items, or other important information. The database 124 may include one or more magnetic storage devices, optical storage devices, solid state storage devices, or the like.

The term "switch" or "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

It should be emphasized that the configuration of the server, user communication endpoints, and other elements as shown in FIG. 1 is for purposes of illustration only and should not be construed as limiting the invention to any particular arrangement of elements.

Figure 2:
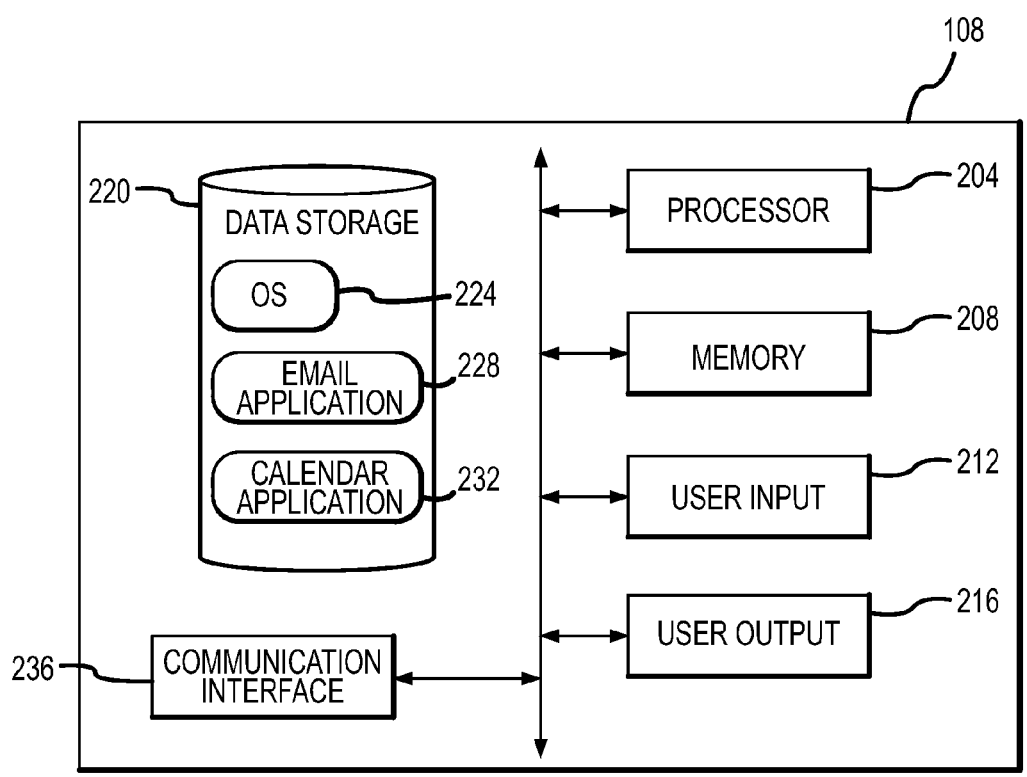
FIG. 2 is a block diagram depicting an exemplary communication endpoint in accordance with embodiments of the present invention.

With reference now to FIG. 2, components of a communication endpoint 108, like a communications or computing device, are depicted in block diagram form in accordance with embodiments of the present invention. The components may include a processor 204 capable of executing program instructions. Accordingly, the processor 204 may include any general purpose programmable processor, digital signal processor (DSP) or controller for executing application programming. Alternatively, the processor 204 may comprise a specially configured application specific integrated circuit (ASIC). The processor 204 generally functions to run programming code implementing various functions performed by the communication endpoint 108 or server 112.

A communication endpoint 108 or server 112, 116 may additionally include memory 208 for use in connection with the execution of programming by the processor 204 and for the temporary or long term storage of data or program instructions. The memory 208 may comprise solid state memory resident, removable or remote in nature, such as DRAM and SDRAM. Where the processor 204 comprises a controller, the memory 208 may be integral to the processor 204.

In addition, the communication endpoint 108 or server 112 may include one or more user inputs or means for receiving user input 212 and one or more user outputs or means for outputting 216. Examples of user inputs 212 include keyboards, keypads, touch screens, touch pads and microphones. Examples of user outputs 216 include speakers, display screens (including touch screen displays) and indicator lights. Furthermore, it can be appreciated by one of skill in the art that the user input 212 may be combined or operated in conjunction with a user output 216. An example of such an integrated user input 212 and user output 216 is a touch screen display that can both present visual information to a user and receive input selections from a user.

A communication endpoint 108 or server 112, 116 may also include data storage 220 for the storage of application programming and/or data. In addition, operating system software 224 may be stored in the data storage 220. The data storage 220 may comprise, for example, a magnetic storage device, a solid state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

Examples of other applications that may be stored in the data storage 220 include an email application 228 that allows the user of the endpoint 108 to view, access, and manipulate data on the email server 112. For example, the email application 228 may provide a user friendly interface that presents data from the email server 112 to the user in a logical fashion, allows the user to create emails for transmission to other users associated with the communication system 100 and further respond to and/or forward emails received from other users. Another application that may reside in data storage 220 is a calendar application 232. The calendar application 232 may maintain a personal event calendar and resource availability chart for a user associated with the endpoint 108. The calendar application 232 may be used to view upcoming events or tasks for a particular person or group of people. The email application 228 and calendar application 232 may work cooperatively to schedule calendar items via email with other users of the network 100. The data storage 220 may also contain application programming and data used in connection with the performance of other functions of the communication endpoint 108 or server 112. For example, in connection with a communication endpoint 108 such as a telephone or IP telephone, the data storage may include communication application software. As another example, a communication endpoint 108 such as a Personal Digital Assistant (PDA) or a general purpose computer may include a word processing application in the data storage 220.

A communication endpoint 108 or server 112 may also include one or more communication network interfaces 236. Examples of communication network interfaces 236 include a network interface card, a modem, a wired telephony port, a serial or parallel data port, radio frequency broadcast receiver or other wired or wireless communication network interfaces.

Figure 3:
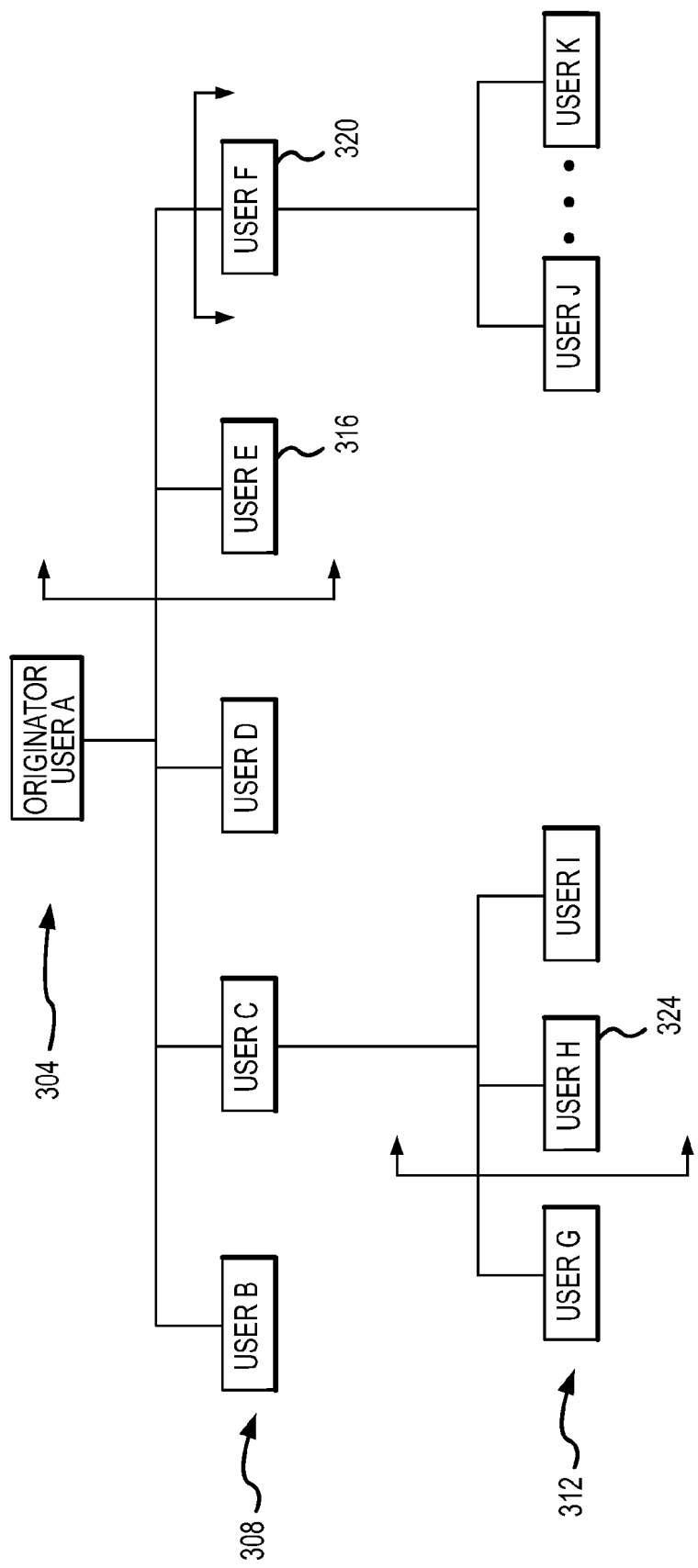
FIG. 3 is a hierarchical diagram of users that can receive and specialize calendar items in accordance with embodiments of the present invention.

With reference now to FIG. 3, a calendar item hierarchy will be described in accordance with at least some embodiments of the present invention. A single user, for example User A, generally originates a calendar item. User A may wish to schedule a meeting with a number of other users and can invite them using the email application 228 and calendar application 232. User A determines the original parameters of a calendar item. The parameters of the calendar item may include the location, time, required resources for the meeting (i.e., required shared resources or resources that each user is required to bring), and other agenda items. In another embodiment, the original calendar item may include parameters associated with completing a task like calling a particular entity and retrieving certain information from that entity. The original calendar item with its original parameters is transmitted to the intended recipients, for example Users B, C, D, E, and F. As can be appreciated the original calendar item may be transmitted to a greater or lesser number of users than depicted. Each of the original recipients of the calendar item can then determine if they agree to the original parameters or if they make sense to that user. If the original recipients agree to the parameters then they accept the calendar item and notification of the same may be transmitted back to User A.

One or more of the original recipients may further decide to invite other users. For example, User C may decide to invite Users G, H, and I and User F may decide to invite Users J and K. When these additional users are included as recipients of the calendar item they may receive a copy of the original calendar item as prepared by User A or they may receive a specialized calendar item with parameters that differ from those of the original calendar item. As can be seen in FIG. 3, a number of layers of hierarchy may be developed as users receive calendar items and further invite other users to participate in the calendar item. The original level 304 relates generally to the user who originated the calendar item. The originator may be given certain administrative rights related to the calendar item. For example, the originator may be the only user allowed to change the parameters of the original calendar item. In one embodiment, other users are allowed to specialize parameters of the original calendar item for a particular subset of the population invited to participate in the calendar item, but the originator may be the only user allowed to completely change parameters for the entire population.

The first layer 308 corresponds to original recipients of the original calendar item. These original recipients may invite other users or simply specialize one or more parameters of the original calendar item. For example, Users E and F may be in a completely different geographic location than Users A-D. User A may have generated the original calendar item to include a parameter defining the location of the meeting to be in the East conference room of a New Jersey office. Users E and F may be in San Jose Calif. so the location parameter of the original calendar item does not necessarily apply to them. Based on their location, User E may decide to specialize the location parameter of the original calendar item, thereby creating a specialized calendar item.

User E can then send the specialized calendar item to User F that replaces the original calendar item or at least updates the specialized parameter of the original calendar item. User E can be referred to as a primary first level specializer 316 because he/she was the first to specialize the original calendar item in the first layer 308. When User F receives the specialized calendar item from User E, he/she may decide to invite a few more users, for example Users J and K. Upon inviting Users J and K, User F may decide to further specialize the calendar item received from User E. User F may wish to invite Users J and K and include a resource parameter requesting that they bring their laptops to the meeting in San Jose. Since User F added another layer of specialization to the original calendar item, User F can be referred to as a secondary first level specializer 320. As can be appreciated, more specializers may exist on the first layer 308 of the hierarchy. If User F had decided to simply change User E's specialized calendar item for Users E, F, J, and K. (i.e., the entire population of recipients of the specialization), User F would either need to request that User E change the parameter of the first specialization or generate a new calendar item for transmission to all users.

The second layer 312 corresponds to invited users that were not a part of the original recipient's list. Like users in the first layer, users in the second layer 312 can create specializations of calendar items. For instance, when Users G, H, and I received the original calendar item from User C, User H may decide that one of the parameters of the original calendar item should be specialized. As an example, Users H and I may work the night shift in New Jersey and therefore the original meeting time parameter may not apply to Users H and I. Rather, Users H and I may decide to meet at a different time to review issues raised in the original meeting. They may also decide to record the original meeting and review the tape of the meeting at their meeting. Thus, User H may specialize a required resource parameter to include a VCR, whereas the attendees of the original meeting do not need a VCR. Since User H was the first specializer in the second layer 312 he/she is referred to herein as a primary second level specializer. As can be appreciated, more specializers may exist in any one of the first and second layers or in further layers created by the addition of new invitees.

Figure 4:
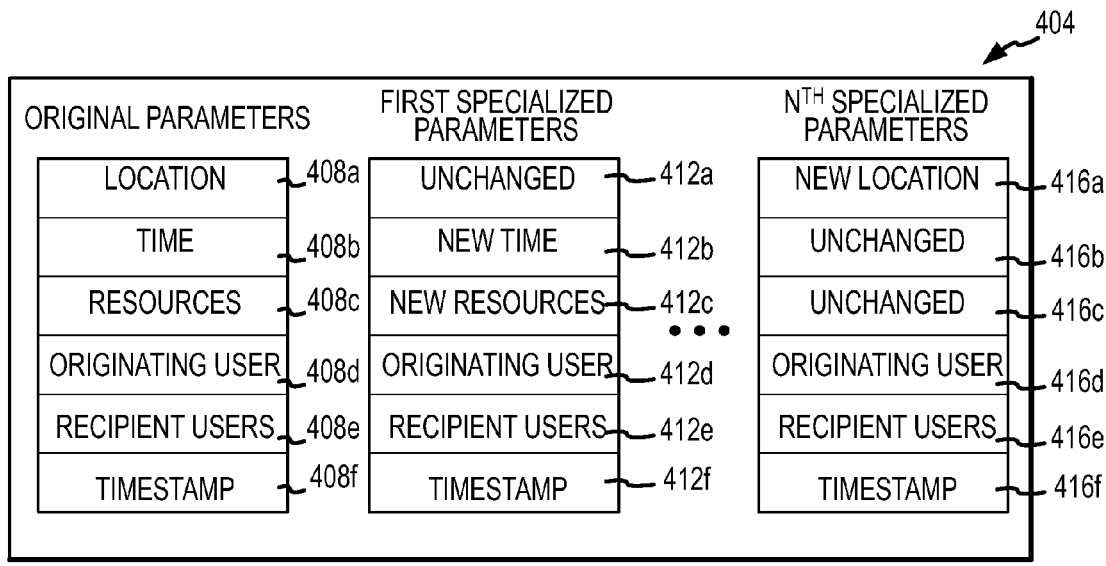
FIG. 4 is a block diagram depicting a logical representation of a specialized calendar item in accordance with embodiments of the present invention.

FIG. 4 depicts a calendar item 404 with original parameters 408 and specialized parameters 412 and 416 in accordance with at least some embodiments of the present invention. Multiple parameters may be stored as a part of the original parameters 408 of a calendar item 404. For example, the original parameters may include, without limitation, location parameters 408a, time parameters 408b, and resource parameters 408c, originating user 408d, recipient users 408e, and timestamp 408f, where a lesser or greater number of original parameters may exist depending upon how the original calendar item 404 was created. One or more of the original parameters 408 may be specialized based on a specializer's preferences. The first set of specialized parameters 412a-f may be stored in addition to or substitution of the original parameters 408. In other words, the specialized parameters 412 may replace the original parameters 408 or may be stored along with the original parameter 408. In an alternative embodiment, the most recent specialized parameter 412 may be stored along with the previous parameter, regardless of whether the previous parameter was the original parameter or a specialized parameter.

The maintenance of specialized parameters 412 for a specialized calendar item 404 allows the scheduling agent 120 to determine if there are any conflicts with the specialized parameter 412 and any other instances of that parameter in an associated calendar item, where calendar items may be associated if one calendar item is the specialization of another calendar item or if both calendar items have similar parameters (e.g., meeting place and time, meeting time and required shared resources, etc).

The first set of specialized parameters 412a-f may further be specialized up to n times until an nth set of specialized parameters 416a-f are created. Similar to the first set of specialized parameters 412, the nth set of specialized parameters 416 may include only changed parameters along with references to any unchanged parameter from the first specialized set of parameters 412 and/or the original parameters 408. Each subsequent specialization of a calendar item occurs at a later point in time than the previous specialization.

Typically, identities of or links/pointers to data structures associated with relevant parties are stored with the specialized parameters 412, 416. In this manner, when a change to a specialized parameter is made it is easier to propagate the change to the affected parties. With reference to the example of FIG. 3, specialized parameters for the grouping of users E 316 and F 320 are stored along with identifies of, links, or pointers to data structures associated with users E and F. The same is true for the other groupings of users, namely Users F and J-K, Users C and G-I, and finally Users H and I. When a user in a group subsequently changes a specialized parameter, it is easily propagated to the other members of the impacted grouping.

Figure 5:
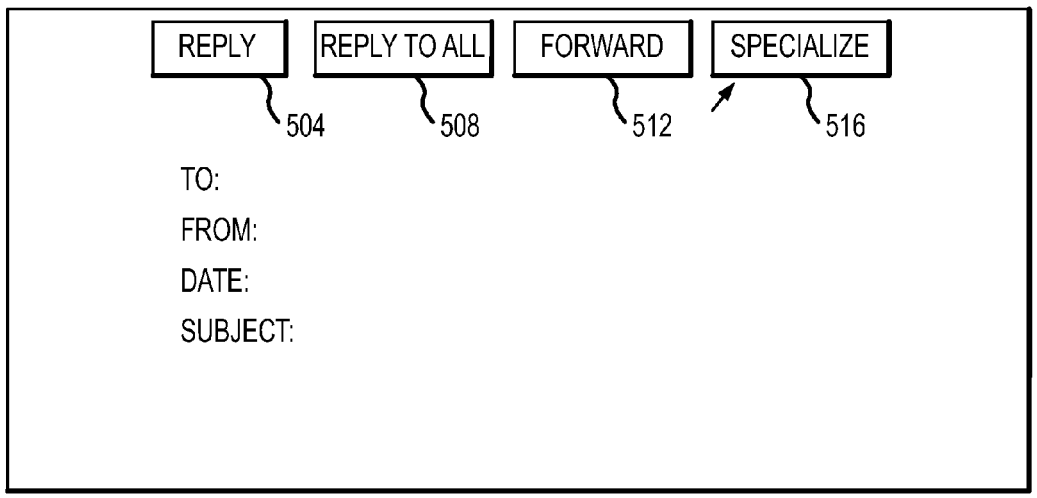
FIG. 5 is a first screen shot of an exemplary email application used in conjunction with calendar items in accordance with embodiments of the present invention.

With reference now to FIG. 5, an exemplary user interface will be described in accordance with at least some embodiments of the present invention. The user interface depicted may be included as part of the user output 216 and/or user input 212. When a user receives an email and/or a calendar item he/she may view the email/calendar item via an appropriate application like the email application 228 and/or calendar application 232. When a calendar item is viewed it may include a number of response options with associated buttons. For example, the calendar item may include a reply button 504 that allows the receiver to reply to the sender, a reply to all button 508 that allows the receiver to reply to the sender and all other recipients, a forward button 512 that allows the receiver to invite another user to participate in the received calendar item, and/or a specialize button 516 that allows the user to specialize the received calendar item.

Figure 6:
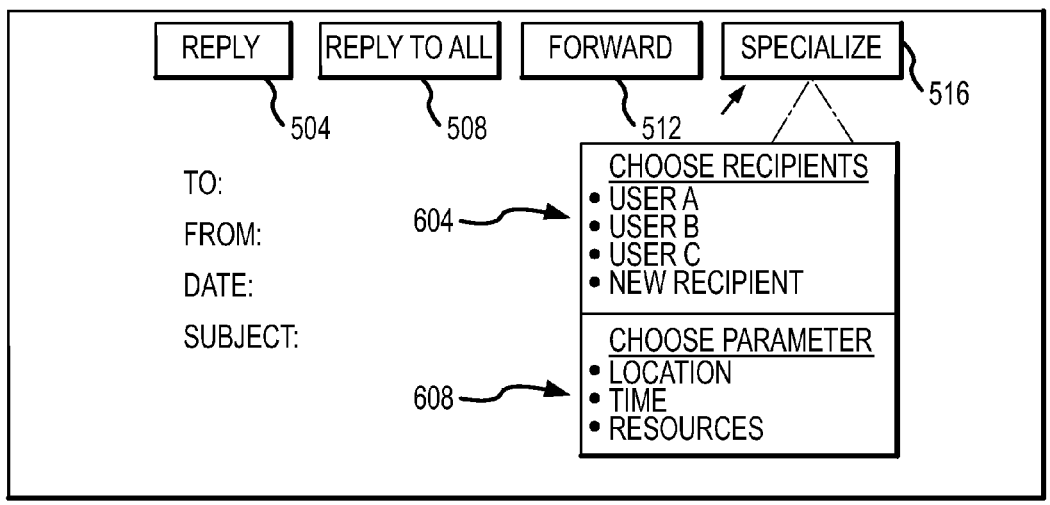
FIG. 6 is a second screen shot of an exemplary email application used in conjunction with calendar items in accordance with embodiments of the present invention.

In accordance with one embodiment, by actuating the specialize button 516, the recipient may be presented with a number of options related to specializing the calendar item as can be seen in FIG. 6. The types of options the recipient is presented with may include, for example, recipient options 604 and parameter change options 608. The user may define what other user's he/she wants to send the specialized calendar item to. The recipients of the specialized calendar item may be commonly associated with a particular location, job function, department, or the like and therefore may be included as recipients of the specialized calendar item. By choosing one or more of the parameters options 608 a user may specialize the parameter from its original value. When a parameter is specialized the original value may be changed or deleted. In another embodiment, there may be no value associated with an original parameter and a specialization of that parameter may be the addition of a value to the parameter. For example, an original calendar item may be sent requesting a meeting time but no location as the originator will be calling the rest of the participants. However, the other recipients may decide to meet in a conference room and thus may specialize the location parameter without changing other original parameters.

Figure 7:
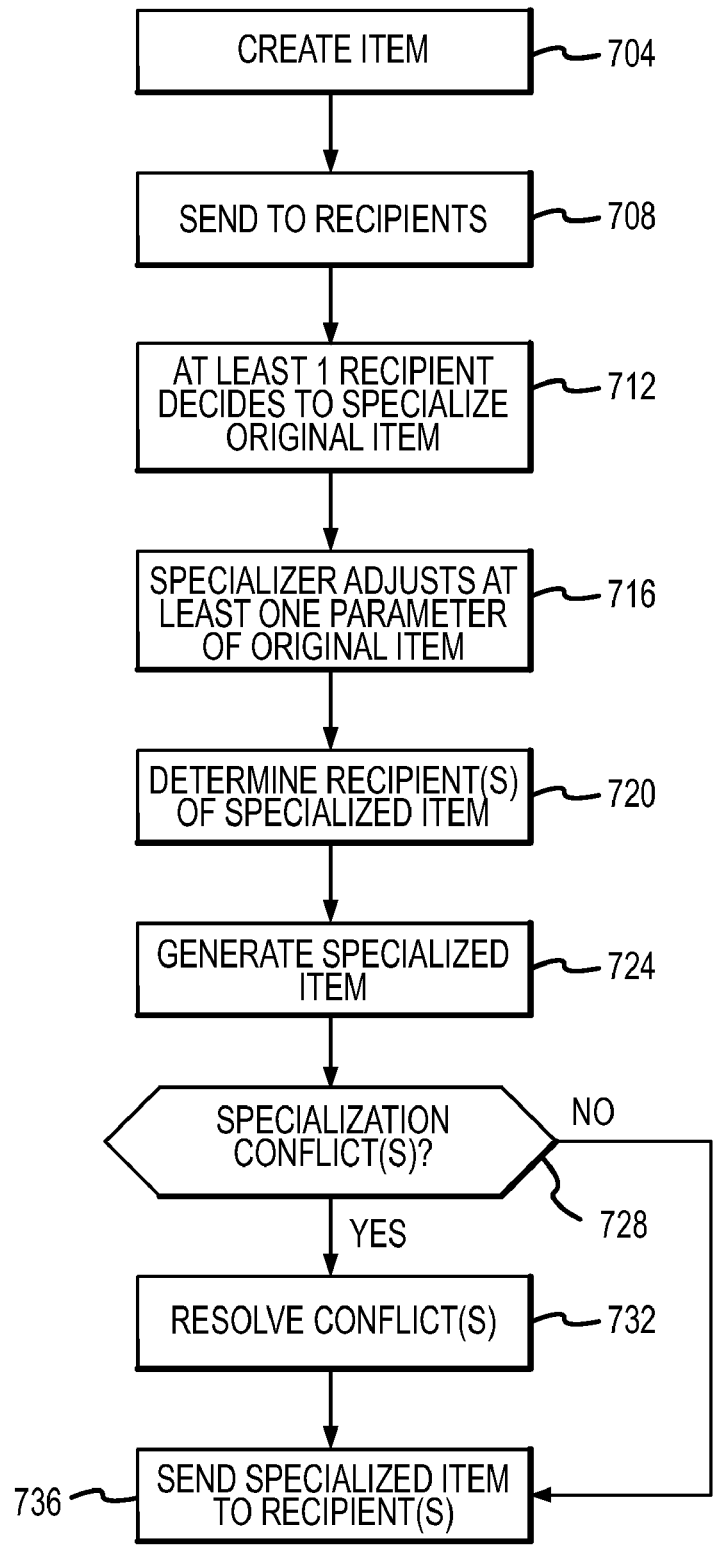
FIG. 7 is a flow chart depicting a method of specializing a calendar item in accordance with embodiments of the present invention.

Referring now to FIG. 7 a method of specializing a calendar item will be described in accordance with at least some embodiments of the present invention. The method begins when a calendar item is created (step 704). The calendar item may be related to a meeting, shared resource, task, or other type of event. The original calendar item is generally defined by at least one original parameter relating to one or more of the location, resources, time, and attendees of the calendar item. The creation of a calendar item may also include the creation of reminder for the calendar item. When the calendar item has been created it is transmitted to recipients via email or some other delivery vehicle and a calendar entry is created for each recipient. The originator's and recipients' calendar entries are linked to one another via some logical linking mechanism. In accordance with alternative embodiments of the present invention, the calendar item may be considered "created" only when each of the recipients agrees to the original parameters of the calendar item. In other words, if no recipient agrees to the original calendar item then it is not necessarily been created. Agreement with the calendar item parameters may be consented directly or indirectly. For example, a user may directly consent to the proposed parameters of the calendar item by clicking a button identifying that they have consented. Alternatively, an indirect consent may be assumed if the user does not decline the proposed calendar item parameters.

Once at least some recipients have received the calendar item (and possibly accepted its parameters), at least one recipient decides to specialize the original calendar item (step 712). Thereafter, the recipient becomes a specializer and is allowed to adjust at least one parameter of the original item (step 716). As noted above, the adjustment of an original parameter may include the addition, deletion, or alteration of the original parameter. As can be appreciated by one of skill in the art, some parameters may have protective mechanisms associated therewith that require the specializer to obtain permission from the originator before any original parameter is specialized. As an example, the originator may send a calendar item to a number of users related to a meeting that he/she would like to have face-to-face. In this instance, the originator may "lock" the location and time parameters. Therefore, if anyone attempts to specialize those parameters they must obtain permission from the originator before doing so. Furthermore, original parameters may be locked on a user-by-user basis, instead of globally applying a parameter lock. Also, a specializer may be allowed to place restrictions on specialized parameters.

After at least one parameter has been adjusted, recipients for the specialized item are determined (step 720). The recipients may include new users that did not originally receive the calendar item or users that were original recipients. Essentially, the recipients of the specialized calendar item can represent a subset of the original recipient population and/or a new population of recipients. After the parameters have been defined and recipients have been identified, a specialized calendar item is generated for each recipient(step 724). The recipient group members' calendar entries containing the specialized parameters are linked to one another. The adjusted parameters are compared with the original parameters to determine if there are any conflicts (step 728). The types of conflicts that may arrive include, without limitation, time conflicts, location conflicts, and/or resource requirement conflicts. For example, a specializer may attempt to change the time of a meeting for certain individuals that have a locked original parameter. The scheduling agent 120 can identify this conflict and ask the specializer to resolve the conflict (step 732). In an alternative embodiment, if two different specializations conflict with one another, one or both of the specializers may be asked to resolve the conflict. In still a further alternative embodiment, the originator may be asked to resolve any specialization conflicts.

After the conflict has been resolved, or in the event there were no identified conflicts, the specializer sends the specialized message to the identified recipients (step 736). When the recipients receive the specialized item, the original item is replaced with the specialized parameters. In another embodiment, the changed parameters of the original calendar item are updated and notification of the same is sent to the recipient, thereby making recipients aware of the changes. This is done instead of sending a new calendar item, which may cause confusion among recipients of the original calendar item and specialized calendar item.

With reference to FIG. 8, a method of updating original calendar item parameters will be described in accordance with at least some embodiments of the present invention. As can be appreciated, as multiple specializations are generated it is determined if any conflicts exist before the specialization is allowed. However, when the originator wishes to change one or more parameters of the original calendar item, the changes may override any conflicts with specialized parameters. Initially, an update to the original calendar item is received (step 804). Thereafter, the scheduling agent 120 determines if any specializations of the original calendar item exist (step 808). In the event that no specializations exist, the parameters of the original calendar item are updated and sent to all recipients (step 812). However, in the event that a specialization exists for the original calendar item, it is determined if the changed parameters of the original calendar item conflict with any specialized parameters of any specialized calendar item (step 816). If there are no conflicts that exist between the updated original parameters and the specialized parameters, then the updated original item is sent to non-recipients of the specialization (step 820). Essentially, if the update by the originator does not affect the specialized population, the specialized population does not need to be troubled with the updated version of the original calendar item. In one embodiment, if the updated parameter is the same parameter as the specialized parameter then it may be determined that there is no conflict. An example of this situation might occur if the originator is in the United States and the recipients of the specialization are in Australia and the originator wanted to change meeting rooms. This particular parameter change has no affect on the specialized population and thus they should not be troubled with such a change. Only people that had planned on meeting with the originator in the same room should be made aware of the change. However, if the originator decides to change the meeting time, then both the specialized population and non-specialized population should be made aware of the parameter change.

In accordance with one embodiment, conflicts between specializations and original updates generally occur if the update parameters were not one of the specialized parameters. In the event that a conflict does exist between the specialized calendar item and updated original calendar item, then the specializer is either notified of the conflict and allowed to make another specialization or the parameter is automatically changed (step 824). After the specializer has updated his/her specialization or the specializations have been automatically changed to reflect the updated original parameters, the updated specialization is set to the specialized population (step 828). Thereafter, the updated original item is sent to the non-specialized population (step 820).

It should be noted that inventive aspects of the present invention are not limited to specializing a single calendar item at a time. Rather, a series of calendar items can be grouped and specialized at substantially the same time. For example, some calendar items include reoccurring appointments (e.g., the calendar item is scheduled every week or every month) with the same parameters. One specialization of that reoccurring appointment could specialize the entire appointment for recipients of the specialization. Alternatively, if a calendar item is associated with a reoccurring appointment, the specialization could be limited to a subset of the reoccurring appointments if the situation warrants such a change.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A hierarchical method for calendar management comprising:
   a first recipient receiving a first calendar item scheduling an event and having at least one parameter from an originator, the first calendar item having a first hierarchical position;
   the first recipient adjusting the at least one parameter to create a second calendar item having the adjusted at least one parameter providing additional, specialized information regarding the event for at least one recipient, the second calendar item being stored in association with and in addition to the first calendar item at a server and the second calendar item having a second, different, hierarchical position than the first calendar item,
   wherein conflicts between the first calendar item and the second calendar item are resolved based on hierarchical positions of the first calendar item and the second calendar item;
   the first recipient determining the at least one second recipient for the second calendar item, wherein the at least one second recipient excludes the originator; and
   the first recipient sending the second calendar item to the at least one second recipient to update a calendar of the at least one second recipient with the adjusted at least one parameter of the event.

2. The method of claim 1, wherein the at least one second recipient comprises a recipient of the first calendar item, further comprising:
   sending the second calendar item to the recipient of the first calendar item;
   adjusting the at least one parameter of the first calendar item according to the second calendar item; and
   notifying a recipient of the first and second calendar items that the at least one parameter has been adjusted.

3. The method of claim 1, wherein adjusting comprises at least one of (i) adding, (ii) removing, and (iii) changing the at least one parameter of the first calendar item.

4. The method of claim 1, further comprising:
   the originator updating a parameter of the first calendar item;
   determining if the updated first calendar item conflicts with the second calendar item; and
   performing at least one of the following:
      (i) in the event that the updated first calendar item conflicts with the second calendar item, updating the parameter in the second calendar item for the at least one second recipient of the second calendar item; and
      (ii) in the event that the updated first calendar item does not conflict with the second calendar item, allowing the second calendar item to remain unchanged.

5. The method of claim 4, wherein the determining if the updated first calendar item conflicts with the second calendar item comprises comparing the updated parameter with the adjusted at least one parameter to determine if each is associated with a common parameter.

6. The method of claim 1, wherein the at least one parameter comprises at least one of a location, time, and resource.

7. The method of claim 1, wherein at least one of a link, reference, and pointer is created logically connecting the first and second calendar items.

8. A non-transitory computer readable medium comprising processor executable instructions operable to perform the method of claim 1.

9. A system for coordinating actions of multiple users based on a hierarchical position, comprising:
   a server including a processor and memory operable to:
   transmit a first calendar item scheduling an event and having a first set of parameters from an originator to one or more users, the first calendar item having a first hierarchical position,
   receive a second calendar item having a second set of parameters having at least one parameter adjusted from the first set of parameters from at least one of the one or more users that received the first calendar item from the originator, the second set of parameters providing additional, specialized information regarding the event for a population of recipients, store the second calendar item in association with and in addition to the first calendar item, and transmit the second calendar item to the population of recipients excluding the originator, such that the first set of parameters received by the population of recipients are altered to reflect the second set of parameters, wherein the population of recipients comprises the one or more users and the second calendar item having a second, different, hierarchical position than the first calendar item, wherein conflicts between the first calendar item and the second calendar item are resolved based on hierarchical positions of the first calendar item and the second calendar item.

10. The system of claim 9, wherein the server is further operable to store the second calendar item in association with the first calendar item.

11. The system of claim 9, wherein the server is further operable to notify the population of recipients that the first set of parameters have been altered to reflect the second set of parameters.

12. The system of claim 9, wherein the at least one parameter comprises at least one of a location, time, and resource.

13. The system of claim 9, wherein the server alters the first set of parameters by at least one of (i) adding, (ii) removing, and (iii) changing at least one parameter in the first set of parameters.

14. The system of claim 9, wherein the server is further operable to receive an updated first calendar item comprising at least one updated parameter from the originator, determine the updated first calendar item conflicts with the second calendar item, and update a parameter in the second calendar item corresponding to the at least one updated parameter for the population of recipients.

15. The system of claim 14, wherein the server is operable to determine that a conflict exists between the first and second calendar item by comparing the at least one updated parameter with an altered parameter in the second set of parameters to determine if each is associated with a common parameter.

16. A calendar server that manages a data structure for a calendar item, comprising:

a database including one or more memory storage devices that store an original set of parameters generated by an originator of a first calendar item scheduling an event, the first calendar item having a first hierarchical position; and at least one specialized parameter associated with the first calendar item, wherein the at least one specialized parameter is associated with a second calendar item generated by at least one or more users that received the first calendar item from the originator and represents a specialization of at least one of the original set of parameters of the first calendar item, the second calendar item stored in association with and in addition to the first calendar item, and having a second, different, hierarchical position than the first calendar item, wherein the second calendar item is transmitted to the at least one recipient excluding the originator such that the original set of parameters received by the population of recipients are altered to reflect the specialized parameter, wherein conflicts between the first calendar item and the second calendar item are resolved based on hierarchical positions of the first calendar item and the second calendar item.

17. The server of claim 16, wherein the original set of parameters comprise at least one of location, time, and resources associated with the first calendar item.

18. The server of claim 16, wherein the first calendar item is associated with a user that is different from the originator.

19. The server of claim 16, wherein multiple specialized parameters from different user groups are associated with one another according to at least one of originator, recipient, and timestamp information stored in associated with the first calendar item.

20. The server of claim 16, wherein multiple specialized parameters from different user groups are associated with one another according to at least one of originator, recipient, and timestamp information stored in association with the calendar item.

* * * * *

UNITED STATES PATENT AND TRADEMARK OFFICE
CERTIFICATE OF CORRECTION

| | |
|---|---|
| PATENT NO. | : 7,827,240 B1 |
| APPLICATION NO. | : 11/619145 |
| DATED | : November 2, 2010 |
| INVENTOR(S) | : Richard J. Atkins et al. |

It is certified that error appears in the above-identified patent and that said Letters Patent is hereby corrected as shown below:

At Column 14, line 12, after "and" insert --that-- therein.

At Column 14, line 32, please delete claim 19 in its entirety, and replace it with the following claim, "19. The server of claim 16, wherein the at least one specialized parameter comprises at least one of a link, reference, and pointer to an associated original parameter.".

Signed and Sealed this
Fourth Day of January, 2011

David J. Kappos
*Director of the United States Patent and Trademark Office*